US005182544A

United States Patent [19]

Aquilera et al.

[11] Patent Number: 5,182,544

[45] Date of Patent: Jan. 26, 1993

[54] SECURITY TAG WITH ELECTROSTATIC PROTECTION

[75] Inventors: Luis Aquilera, Guanica, P.R.; Lawrence C. Appalucci, Villanova, Pa.; Gary Mazoki, Sewell, N.J.

[73] Assignee: Checkpoint Systems, Inc., Thorofare, N.J.

[21] Appl. No.: 780,588

[22] Filed: Oct. 23, 1991

[51] Int. Cl.[5] .................. G08B 13/14; H02H 3/00

[52] U.S. Cl. .................. 340/572; 361/1

[58] Field of Search .................. 340/572, 649–650, 340/825.72; 343/895; 361/1; 324/537

[56] References Cited

U.S. PATENT DOCUMENTS

| | | | |
|---|---|---|---|
| 3,624,631 | 11/1971 | Chomet et al. | 340/572 X |
| 3,810,147 | 5/1974 | Lichtblau | 340/572 |
| 3,967,161 | 6/1976 | Lichtblau | 340/572 X |
| 4,021,705 | 5/1977 | Lichtblau | 340/572 X |
| 4,567,473 | 1/1986 | Lichtblau | 340/572 |
| 4,598,276 | 7/1986 | Tait | 340/572 |
| 4,670,740 | 6/1987 | Herman et al. | 340/572 |
| 4,694,283 | 9/1987 | Reeb | 340/572 |
| 4,728,938 | 3/1988 | Kaltner | 340/572 |
| 4,745,401 | 5/1988 | Montean | 340/572 |
| 4,792,790 | 12/1988 | Reeb | 340/572 |
| 4,864,280 | 9/1989 | van der Meij | 340/572 |
| 4,882,569 | 11/1989 | Dey | 340/572 |
| 4,910,499 | 3/1990 | Benge et al. | 340/572 |
| 4,920,335 | 4/1990 | Andrews | 340/572 |
| 5,081,445 | 1/1992 | Gill et al. | 340/572 |
| 5,103,210 | 4/1992 | Rode et al. | 340/572 |

*Primary Examiner*—Jin F. Ng
*Assistant Examiner*—Thomas J. Mullen, Jr.
*Attorney, Agent, or Firm*—Panitch Schwarze Jacobs & Nadel

[57] ABSTRACT

A security tag for use with an electronic article surveillance system comprises a flexible, substantially planar dielectric substrate having first and second sides. A first conductive pattern is positioned on the first side of the substrate, and a second conductive pattern is positioned on the second side of the substrate. The first and second conductive patterns cooperate to establish a resonant circuit, including at least one inductive element and at least one capacitive element having first and second generally separated plates. A static dissipation member, such as a frangible connection member, is provided for electrically connecting together the first and second plates of the at least one capacitive element for preventing the at least one capacitive element from charging and short circuiting to thereby provide electrostatic discharge protection for the security tag. In one embodiment, the frangible connection is formed by a conductive frame member positioned on the substrate and extending around at least a portion of the second conductive pattern.

14 Claims, 3 Drawing Sheets

SECURITY TAG WITH ELECTROSTATIC PROTECTION

BACKGROUND OF THE INVENTION

The present invention relates generally to security tags for use with an electronic security system for detecting the unauthorized removal of articles from an area and, more particularly, to such security tags which include electrostatic protection.

The use of electronic article surveillance (EAS) systems for detecting and preventing theft or other unauthorized removal of articles or goods from retail establishments and/or other facilities, such as libraries, has become widespread. In general, EAS systems utilize a label or security tag containing an electronic circuit, such as an inductor/capacitor resonant circuit, which is secured to an article or the packaging for the article. A transmitter tuned to the frequency of the resonant circuit of the security tag is employed for transmitting electromagnetic energy into a protected or security area typically proximate to the exit of a retail establishment or other facility. A receiver, also tuned to the resonant frequency of the tag, is also located proximate to the protected area. The transmitter produces a continuous swept radio frequency field which is continuously received by the receiver. If an article containing a security tag enters the protected area, the resonant circuit within the tag resonates, providing a disturbance in the electromagnetic field which is detected by the receiver for activation of an alarm to alert security personnel.

In order to prevent accidental activation of an alarm by a person who has actually purchased an article having a security tag or who is otherwise authorized to remove an article having a security tag from a facility, security tags may be deactivated. One method of deactivating a security tag involves momentarily placing the tag near a deactivation device which subjects the tag to electromagnetic energy at a power level sufficient to cause the resonant circuit to short circuit. In order to avoid having the deactivation electromagnetic energy at a high power level, deactivatable security tags typically have one or more capacitor elements in which the dielectric between the plates of one or more of the capacitor elements is weakened or reduced so that the capacitor plates may be short circuited when exposed to relatively low power levels at the resonant frequency. The structure and operation of such deactivatable security tags is described in detail in U.S. Pat. Nos. 4,498,076 entitled "Resonant Tag and Deactivator for Use in Electronic Security System", and 4,728,938 entitled "Security Tag Deactivation System", each of which is incorporated herein by reference.

Other, more recently developed security tags are both activatable and deactivatable. Activatable/deactivatable security tags typically include a resonant circuit having at least two capacitors, each of which includes a weakened or reduced dielectric between the capacitor plates to facilitate short circuiting of the capacitors. The resonant circuits of activatable/deactivatable tags typically have an initial resonant frequency which is generally above the frequency range of the EAS system. When these tags are exposed to a sufficient level of electromagnetic energy at the initial resonant frequency, one of the capacitors becomes short circuited thereby shifting the resonant frequency of the security tag to a frequency within the frequency range of the EAS system. The security tag may be deactivated by exposing the resonant circuit to a sufficient level of electromagnetic energy at the new resonant frequency to short circuit the second capacitor thereby either preventing the resonant circuit from resonating at all or shifting the frequency of the resonant circuit beyond the frequency range of the EAS system. The structure and operation of activatable/deactivatable tags of this type is described in pending U.S. Pat. No. 5,081,445, entitled "Method for Tagging Articles Used in Conjunction with an Electronic Article Surveillance System, and Tags or Labels Useful in Connection Therewith", and in pending U.S. Pat. No. 5,103,210, entitled "Activatable/Deactivatable Security Tag for Use with an Electronic Security System", both of which are incorporated herein by reference.

While deactivatable and activatable/deactivatable security tags have been shown to be very effective when utilized in EAS systems, they have been found to suffer from certain drawbacks. Security tags of this type are typically formed of a flexible, substantially planar dielectric substrate having a first conductive pattern on a first side and a second conductive pattern on the second side, the conductive patterns together establishing the resonant circuit with the substrate forming the dielectric between the plates of the capacitor(s). Under certain circumstances, an electrostatic build-up occurs between the two sides of the substrate resulting in the charging of the capacitor(s). In some cases, the electrostatic build-up results in a discharge of sufficient energy to cause a premature breakdown of the dielectric between the plates of one or more of the capacitors thereby short circuiting one or more of the capacitors and either prematurely activating the security tag (in the case of the activatable/deactivatable tag) or prematurely deactivating the security tag. In either event, such security tags are not usable in an EAS system.

The present invention comprises a security tag which includes static dissipation means, such as frangible connection means or conductive frame member positioned on the substrate for draining any static electricity charge build-up from the substrate. In a preferred embodiment, the frangible connection means or frame member is employed for electrically connecting together both plates of at least some and preferably all of the capacitors of the security tag at least during manufacture, shipment and storage of the tag. The static dissipation means or frame member effectively prevents electrostatic build-up and discharge between the two sides of the dielectric substrate and, therefore, prevents the premature short circuiting of the capacitors. In the preferred embodiment, when the security tag is to be used, the connection between at least one plate of each of the capacitors and the frame member is broken to permit normal use of the security tag in conjunction with an EAS system.

SUMMARY OF THE INVENTION

Briefly stated, the present invention comprises a security tag for use with an electronic article surveillance system. The security tag includes a flexible, substantially planar dielectric substrate having a first side and a second side. A first conductive pattern is positioned on the first side of the substrate and a second conductive pattern is positioned on the second side of the substrate. The first and second conductive patterns cooperate to establish a resonant circuit including at least one inductive element and at least one capacitive element having first and second generally separated plates. A frangible connection means is provided for electrically connecting together the first and second plates of the at least one capacitive element for preventing the capacitive element from charging to thereby provide electrostatic protection for the security tag. In one embodiment, the frangible connection means comprises a conductive frame member positioned on the substrate and extending around at least a portion of one of the conductive patterns, the frame member also being electrically connected to the other conductive pattern.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangement and instrumentalities disclosed. In the drawings.

DESCRIPTION OF PREFERRED EMBODIMENT

Figure 5:
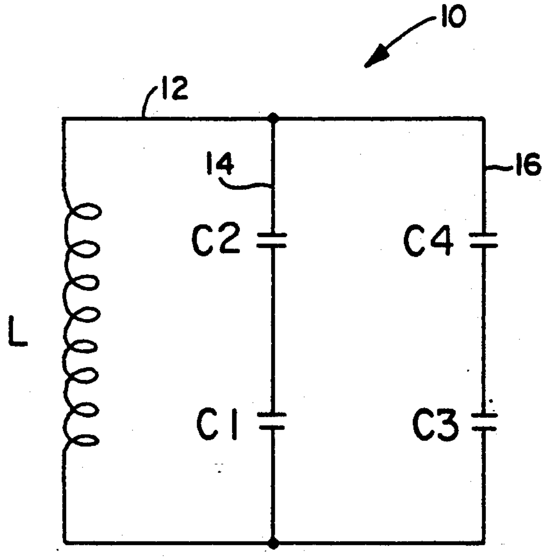
FIG. 5 is an electrical schematic of the resonant circuit of the security tag of FIGS. 1 and 2 after the frangible connection is broken.

Referring to the drawings, wherein the same reference designations are applied to corresponding components throughout the figures, there is shown in FIG. 5 an electrical schematic diagram of an activatable/deactivatable security tag or tag 10 in accordance with the present invention. The schematic of FIG. 5 shows a resonant circuit 12 which is comprised of an inductive element or inductor L which is connected in parallel with a capacitance comprising a first capacitive branch 14 and a second capacitive branch 16. The first capacitive branch 14 includes a first capacitive element or capacitor Cl connected in series with a second capacitive element or capacitor C2. Similarly, the second capacitive branch 16 includes a third capacitor C3 connected in series with a fourth capacitor C4.

The resonant circuit 12 shown in FIG. 5 is substantially the same as the resonant circuit which is shown and described in detail in U.S. Pat. No. 5,103,210 entitled "Activatable/Deactivatable Security Tag for Use with an Electronic Security System". Complete details of the structure and operation of the resonant circuit 12 including details regarding the activation and deactivation of the resonant circuit 12 may be obtained by referring to the referenced patent application and need not be presented in detail herein for a complete understanding of the present invention.

Briefly, the size or values of the inductor L and the four capacitors C1, C2, C3 and C4 are determined based upon the desired resonant frequencies of the resonant circuit 12 and the need to maintain a low induced voltage across the plates of the capacitors. In its initial configuration as shown in FIG. 5, the first resonant frequency of resonant circuit 12 is selected to be within a first frequency range which is outside of the detection frequency range of an EAS system with which the tag 10 is to be employed. For purposes of illustrating the present embodiment, the preferred frequency for the EAS system is assumed to be 8.2 MHz. Preferably, the initial resonant frequency of resonant circuit 12 for purposes of illustrating the invention is selected to be approximately 16 MHz, a frequency which is outside of the detection frequency range of a typical EAS system. Thus, if a tag having a resonant circuit 12 is placed within the area of an EAS system operating at a detection frequency of 8.2 MHz, the resonant circuit 12 does not resonate and, therefore, the EAS system does not generate an alarm when an article having a tag 10 attached thereto passes through the system.

Activation of the tag 10 is obtained by exposing the resonant circuit 12 to energy at the first resonant frequency, 16 MHz, at a power level sufficient to build up an induced voltage between the plates of capacitors C2 and C4 and to short circuit one of the capacitors C2 or C4 thereby establishing a new resonant frequency for the resonant circuit 12 which is within the detection range of the EAS system. Likewise, deactivation of the tag 10 is obtained by exposing the new resonant circuit to electromagnetic energy at the second resonant frequency and having sufficient power to short circuit the other of the two capacitors C2 or C4 and to thereby shift the resonant frequency of the resonant circuit 12 to a third resonant frequency which is below the detection frequency of the EAS system.

Figure 1:
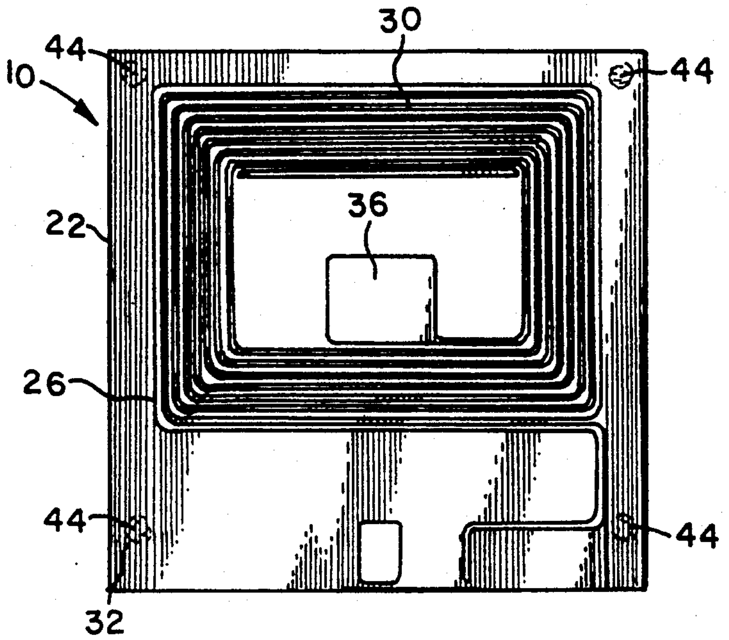
FIG. 1 is a top plan view of the preferred embodiment of a printed circuit security tag in accordance with the present invention.
Figure 2:
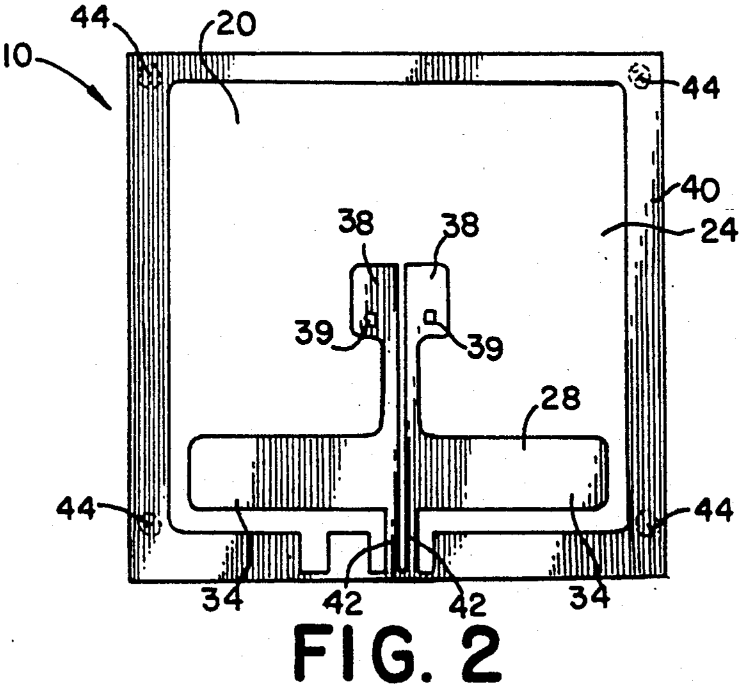
FIG. 2 is a bottom plan view of the security tag of FIG. 1.

FIGS. 1 and 2 illustrate opposite sides of a preferred physical embodiment of the security tag 10 which is schematically illustrated by FIG. 5. The tag 10 is comprised of a dielectric substrate 20 which is preferably flexible and substantially planar. The substrate 20 in the presently preferred embodiment is fabricated of a material generally well known in the article surveillance art having predetermined insulative and dielectric characteristics. Preferably, the substrate 20 is made from a polymeric material, preferably polyethylene. However, it will be recognized by those skilled in the art that the substrate 20 may be made from a variety of polymeric or other materials.

The substrate 20 has a first primary side or top surface 22 and a second primary side or bottom surface 24. A first conductive pattern 26 (FIG. 1) is formed on the first side 22 of the dielectric substrate 20 and a second conductive pattern 28 (FIG. 2) is formed on the second side 24 of the dielectric substrate 20. The conductive patterns 26 and 28 are formed on the first and second substrate sides 22 and 24, respectively, utilizing electrically conductive materials of a known type, such as aluminum, in a manner which is well known in the EAS art and is described in detail in U.S. Pat. No. 3,913,219 entitled "Planar Circuit Fabrication Process", which is incorporated herein by reference. It will, of course, be appreciated by those skilled in the art that the particular conductive patterns 26 and 28 shown in FIGS. 1 and 2 are only for the purpose of illustrating a preferred embodiment of the invention, and that numerous other conductive patterns, such as the patterns disclosed in the above-referenced U.S. patents, may be developed as alternative embodiments of the invention. Similarly, while it is presently preferred that the known materials and methods set forth in the above-referenced U.S. Pat.

No. 3,913,219 be employed for fabricating the security tag 10, it will be appreciated by those skilled in the art that any other suitable materials and/or fabrication methods could alternatively be employed.

The first and second conductive patterns 26 and 28 cooperate to establish the resonant circuit 12 discussed above. More specifically, in the embodiment shown in FIGS. 1 and 2, the inductor L is formed by the coiled portion 30 of the first conductive pattern 26 on the first substrate side 22. Similarly, the large rectangular conductive area 32 of the first conductive pattern 26 forms one common plate of both capacitors C1 and C3, the second plates of capacitors C1 and C3 being formed by the large generally rectangular conductive areas 34 of the second conductive pattern 28. The first plates of capacitors C2 and C4 are commonly formed by the smaller rectangular conductive area 36 of the first conductive pattern 26 with the second plates of capacitors C2 and C4 being formed by the small, generally rectangular conductive areas 38 of the second conductive pattern 28. As can be appreciated by those skilled in the art, the first and second plates of each of the capacitors are generally in registry and are separated by the dielectric substrate 20.

As discussed briefly above, in order to permit activation and deactivation of the security tag 10, it is necessary to change the resonant frequency of the resonant circuit 12. In the presently preferred embodiment, the security tag is activated by short circuiting the plates of one of either capacitor C2 or C4. Similarly, the security tag 10 is deactivated by short circuiting the plates of the other of capacitors C2 or C4. In order to facilitate short circuiting of capacitors C2 and C4, fusing means comprised of an indentation or "dimple" 39 is placed on each of the rectangular conductive areas 38 of the second conductive pattern 28 thereby diminishing the thickness of the substrate 20 between the plates of both capacitors C2 and C4.

The structure of the security tag as thus far described is substantially the same as that of the security tag described in U.S. Pat. No. 5,103,210, "Activatable/Deactivatable Security Tag for Use with an Electronic Security System". As discussed briefly above, it has been determined that under some circumstances, a security tag 10 of the type described above may be subjected to conditions which result in a build-up of electrostatic energy on the two surfaces of the substrate 20 and in an electrostatic discharge which has the effect of prematurely short circuiting the plates of capacitor C2, capacitor C4, or both capacitors C2 and C4. Such an electrostatic discharge may occur during manufacture of the security tag 10 or subsequently, during shipping, storage or use of the security tag 10. As can readily be understood by those skilled in the art, if either or both of capacitors C2 and C4 are prematurely short circuited, the security tag 10 cannot properly function in an EAS system.

Figure 4:
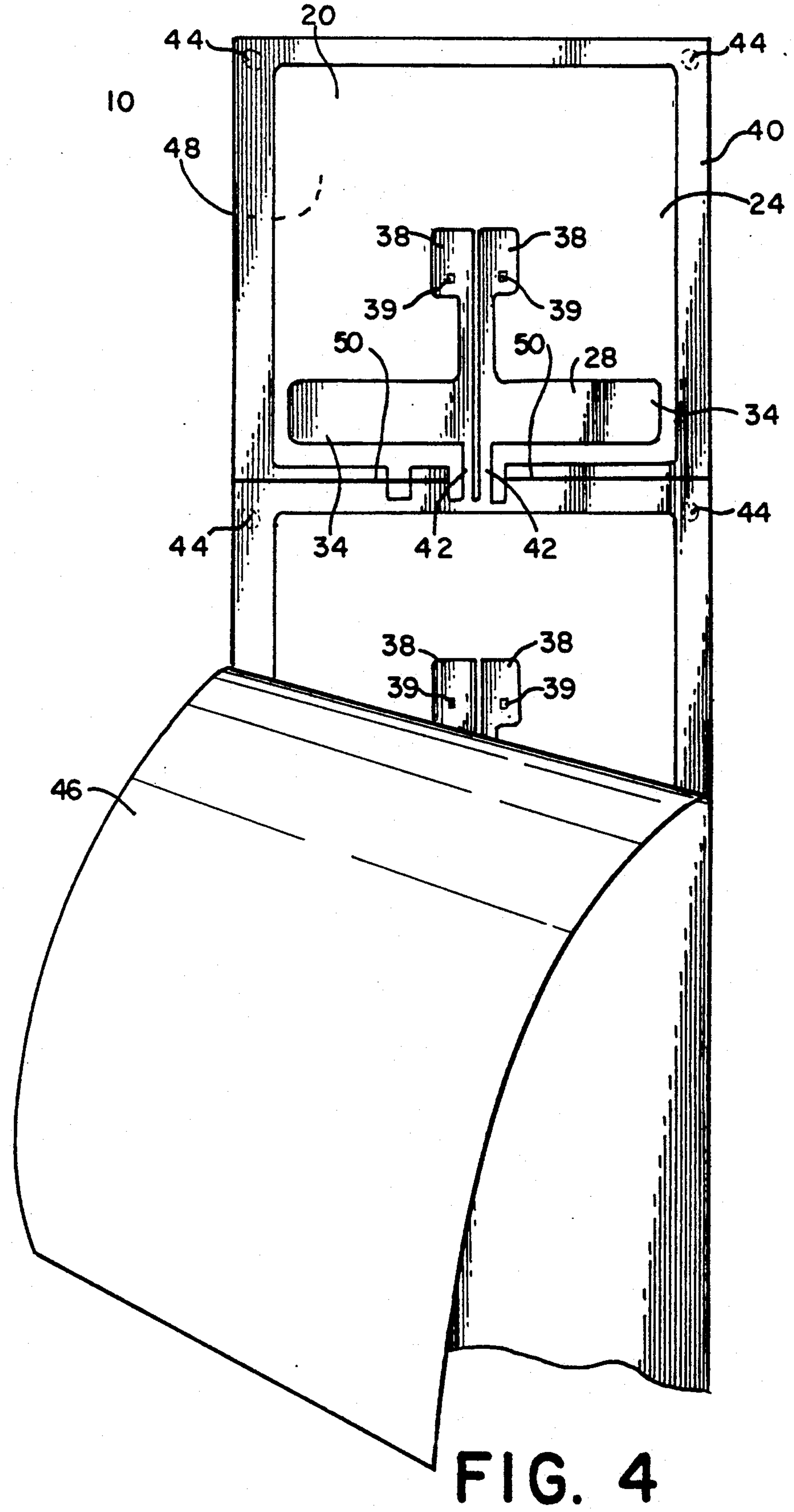
FIG. 4 is a top plan view illustrating a series of security tags of the type shown in FIGS. 1 and 2 on a carrier prior to use.

In order to overcome the potential electrostatic discharge problem, the present invention further comprises static dissipation means which serves as a source for draining static electricity from the substrate 20. In the present embodiment, the static dissipation means includes a frangible connection means in the form of a conductive frame member 40 positioned on the second side 28 of the substrate 20. The frame member is preferably used for temporarily electrically connecting together the first and second plates of at least one and preferably all of the capacitors C1, C2, C3 and C4 until the tag 10 is ready to be activated or used. By electrically connecting together the capacitor plates, the capacitors C1, C2, C3 and C4 are prevented from charging and, therefore, an electrostatic discharge is avoided. As best shown in FIGS. 2 and 4, the frame member 40 extends generally around the outer perimeter of the substrate 20 and around at least a portion and preferably most of the second conductive pattern 28. A pair of thin, generally parallel conductive beams 42 extend between the frame member 40 and the second plates 34 and 38 of each of the capacitors C1, C3, C2 and C4, respectively.

The frame member 40 is also electrically connected to the first conductive pattern 26 for electrically connecting the frame member 40 to the first plates 32 and 36 of each of the capacitors C1, C2, C3 and C4. In the presently preferred embodiment, the electrical connection between the frame member 40 and the first conductive pattern 26 is formed by a weld 44 which extends through the substrate 20 to complete the electrical connection. It will, of course, be appreciated by those skilled in the art that the connection between the frame member 40 and the first conductive pattern 26 may be made in some other manner. Likewise, it will be appreciated by those skilled in the art that the first and second plates of the capacitors may be electrically connected in some manner other than utilizing frame member 40, conductive beams 42 and weld 44. In addition, as an alternate embodiment, the frame member 40 could be positioned on both sides of the substrate 20 (not shown) surrounding a portion of each of the conductive patterns 26 and 28 with both frame sides connected together by a weld extending through the substrate. Thus, the particular embodiment disclosed and described is not meant to be a limitation on the present invention.

Figure 3:
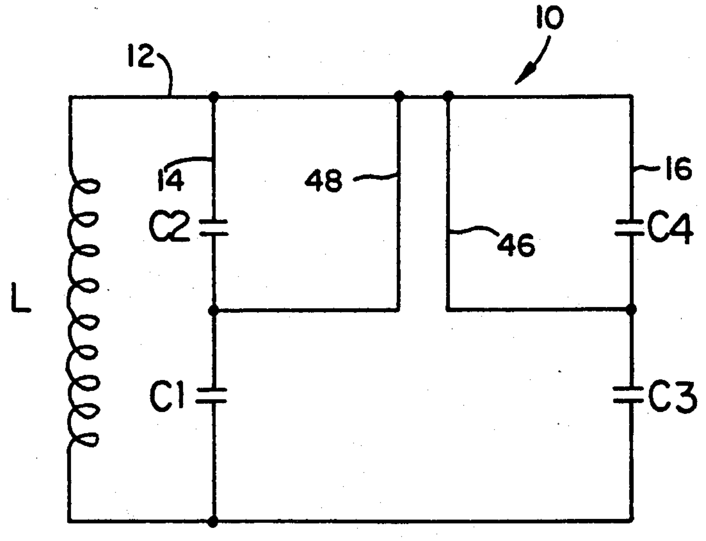
FIG. 3 is an electrical schematic of the security tag shown in FIGS. 1 and 2 when on a carrier prior to use.

FIG. 3 is an electrical schematic diagram illustrating the electrical characteristics of a security tag 10 formed in accordance with the present invention prior to use. On the schematic, the frame member 40, conductive beams 42 and weld 44 are represented by lines 46 and 48. Lines 46 and 48 interconnect both plates of capacitors C2 and C4 directly and interconnect both plates of capacitors C1 and C3 through the inductor L.

A security tag as described above with all of the plates of the capacitors C1, C2, C3 and C4 connected together does not form a resonant circuit and, therefore, is not usable in an EAS system. Hence, when it is time to use the security tag 10, it is necessary to break or remove lines 46 and 48 to permit the capacitors C1, C2, C3 and C4 to properly function so that the circuit 12 resonates to facilitate activation, use and deactivation of the security tag 10. In the presently preferred embodiment, the small conductive beams 42 are broken to thereby break the connection between the second plates 34 and 38 of each of the capacitors and the frame member 40. As best shown in FIG. 4, security tags 10 made in accordance with the present invention are preferably formed end to end in elongated strips. The first side or top surface 22 of the strips of the tags 10 are coated with an adhesive for use in attaching the security tags 10 to articles or packaging, and a protective release sheet 46 is applied over the adhesive. A paper backing 48 is applied by an adhesive to the second side or bottom surface 24 of the tags 10. The paper backing 48 and substrate 20 are die cut along a line 50 which extends from the right and left sides of each of the security tags 10 when viewing FIG. 4, toward the center. However, the die cut does not extend through the area of the two conductive beams 42.

When a security tag 10 is to be used, a user first removes the release sheet 46 from the tag 10 to expose the adhesive on the top surface which is used for attaching the tag 10 to an article or its packaging. The user then separates the tag from the remaining tags on the strip of tags by effectively tearing the paper backing 48 and substrate 20 along the die cut line 50. The separating of the tag from the strip in this manner effectively completes the die cut line 50 through the center portion of the tag and thereby cuts through the conductive beams 42 to sever the connection between the second plates 34 and 38 of the capacitors and the frame member 40. A small non-conductive area 52 on the front surface 22 of the substrate 20 (FIG. 1) is positioned on the opposite side of the conductive beams 42 to prevent the beams 42 from contacting the first conductive pattern 26 during or after separation of the tag from the tag strip. The tag 10 is then activated in the manner described above.

From the foregoing description, it can be seen that the present invention comprises a security tag which includes electrostatic protection for preventing premature short circuiting one or more of the capacitors on the tag. It will be appreciated by those skilled in the art that changes may be made to the above-described embodiment of the invention without departing from the broad inventive concepts thereof. For example, the same inventive concepts could be employed in connection with an activatable/deactivatable security tag having only two capacitors, both of which include a dimple or other fusing means. Similarly, the present invention may be employed in connection with a deactivatable tag which employs either a single capacitor or two capacitors, one of which includes fusing means. It is understood, therefore, that this invention is not limited to the particular embodiment disclosed but is intended to cover any modifications which are within the scope and spirit of the invention as defined by the appended claims.

We claim:

1. A security tag for use with an electronic article surveillance system comprising:

- a flexible, substantially planar dielectric substrate having a first side and a second side;
- a first conductive pattern positioned on the first side of the substrate;
- a second conductive pattern positioned on the second side of the substrate, the first and second conductive patterns cooperating to establish a resonant circuit including at least one inductive element and at least one capacitive element having first and second generally separated plates; and
- a conductive frame member positioned on the substrate and extending around at least a portion of one of the conductive patterns, the conductive frame member establishing an electrical connection between the first and second plates of said at least one capacitive element to prevent said at least one capacitive element from charging to thereby provide electrostatic discharge protection for the security tag.

2. The security tag as recited in claim 1 wherein the electrical connection between the first and second capacitive element plates is a frangible connection which is broken prior to use of the security tag to permit said at least one capacitive element to charge when exposed to an electronic article surveillance system.

3. The security tag as recited in claim 2 wherein the inductive element is established by the first conductive pattern on the first side of the substrate, and the frame member is positioned on the second side of the substrate.

4. The security tag as recited in claim 3 wherein the frame member is electrically connected to the first conductive pattern by at least one weld which extends through the substrate.

5. The security tag as recited in claim 2 wherein the frangible connection comprises at least one conductive beam extending between at least one of the capacitive element plates and the frame member.

6. A security tag for use with an electronic article surveillance system comprising:

- a flexible, substantially planar dielectric substrate having a first side and a second side;
- a first conductive pattern positioned on the first side of the substrate;
- a second conductive pattern positioned on the second side of the substrate, the first and second conductive patterns cooperating to establish a resonant circuit including at least one inductive element and at least one capacitive element having first and second generally separated plates; and
- frangible connection means for electrically connecting together the first and second plates of said at least one capacitive element for preventing said at least one capacitive element from charging to thereby provide electrostatic discharge protection for the security tag.

7. The security tag as recited in claim 6 wherein the frangible conductive connection means comprises a conductive frame member extending around at least a portion of the second conductive pattern, said frame member being electrically connected to the second plate of said at least one capacitive element by a conductive beam, said frame member also being electrically connected to the first conductive pattern.

8. A security tag for use with an electronic article surveillance system comprising:

- a flexible, substantially planar dielectric substrate having a first side and a second side;
- a first conductive pattern positioned on the first side of the substrate;
- a second conductive pattern positioned on the second side of the substrate, the first and second conductive patterns cooperating to establish a resonant circuit for resonating at a predetermined frequency within a first predetermined frequency range, the resonant circuit including at least one inductive element and at least two capacitive elements, each of the capacitive elements having a first plate positioned on the first side of the substrate and a second plate positioned on the second side of the substrate, at least one of the capacitive elements including fusing means for short circuiting said at least one capacitive element upon exposure of the resonant circuit to electromagnetic energy within the first predetermined frequency range of at least a predetermined minimum power level for changing the resonant frequency of the resonant circuit to a frequency beyond the first predetermined frequency range; and
- frangible connection means for electrically connecting together the first and second plates of each of said at least one capacitive element including said fusing means for preventing said at least one capacitive element from charging and prematurely short circuiting as a result of electrostatic discharge.

9. The security tag as recited in claim 8 wherein the frangible connection means comprises a conductive frame member extending around at least a portion of the second conductive pattern, said frame member being electrically connected to the second plate of each of said capacitive elements by at least one conductive beam, said frame member also being electrically connected to the first conductive pattern.

10. A security tag for use with an electronic article surveillance system comprising:

a flexible, substantially planar dielectric substrate having a first side and a second side;

a first conductive pattern positioned on the first side of the substrate;

a second conductive pattern positioned on the second side of the substrate, the first and second conductive patterns cooperating to establish a resonant circuit for resonating at a first predetermined frequency within a first predetermined frequency range, the resonant circuit including at least one inductive element and at least four capacitive elements, each of the capacitive elements having a first plate positioned on the first side of the substrate and a second plate positioned on the second side of the substrate, two of the capacitive elements including fusing means for short circuiting a first of said two capacitive elements upon exposure of the resonant circuit to electromagnetic energy within the first predetermined frequency range of at least a predetermined minimum power level for changing the resonant frequency of the resonant circuit to a second frequency within a second predetermined frequency range beyond the first predetermined frequency range, and for subsequently short circuiting the second of said two capacitive elements upon exposure of the resonant circuit to electromagnetic energy within the second predetermined frequency range of at least a predetermined minimum power level for changing the resonant frequency of the resonant circuit to a third frequency within a third predetermined frequency range beyond the second predetermined frequency range; and a frangible connection means for establishing an electrical connection between the first and second plates of at least said two capacitive elements which include the fusing means for preventing said two capacitive elements from charging and prematurely short circuiting as a result of electrostatic discharge.

11. The security tag as recited in claim 10 wherein the frangible connection means comprises a conductive frame member extending around at least a portion of the second conductive pattern, said frame member being electrically connected to the second plate of at least said two capacitive elements which include the fusing means by at least one conductive beam, said frame member also being electrically connected to the first conductive pattern.

12. The security tag as recited in claim 11 wherein the frame member is electrically connected to the second plate of each of the four capacitive elements by a pair of conductive beams.

13. The security tag as recited in claim 12 wherein the frame member is electrically connected to the first conductive pattern by at least one weld extending through the substrate.

14. A security tag for use with an electronic article surveillance system comprising:

a flexible, substantially planar dielectric substrate having a first side and a second side;

a first conductive pattern positioned on the first side of the substrate;

a second conductive pattern positioned on the second side of the substrate, the first and second conductive patterns cooperating to establish a resonant circuit including at least one inductive element and at least one capacitive element having first and second generally separated plates; and a conductive frame member positioned on the substrate and extending around at least a portion of one of the conductive patterns, the conductive frame member establishing an electrical connection between the first and second sides of the substrate to thereby provide static dissipation and electrostatic discharge protection for the security tag.

* * * * *